Oct. 16, 1962

A. E. SWANSON 3,058,780

MATERIAL CONVEYING DEVICE

Filed May 2, 1960

INVENTOR
ARDEN E. SWANSON
BY
Williamson, Schroeder & Palmatier
ATTORNEYS 3,058,780
MATERIAL CONVEYING DEVICE
Arden E. Swanson, Minneapolis, Minn., assignor to Atkinson Bulk Transport Company, Minneapolis, Minn., a corporation of Minnesota
Filed May 2, 1960, Ser. No. 26,252
11 Claims. (Cl. 302—49)

This invention relates to apparatus for conveying pulverulent material and more specifically to apparatus for loading and unloading pulverulent material into and out of containers through the use of compressed air or similar gases intermingled with the material.

The general object of this invention is to provide a novel and improved apparatus, of simple and inexpensive construction and operation, for conveying pulverulent material.

Another object of this invention is to provide a novel and improved apparatus for conveying pulverulent material through the use of compressed air and which is so arranged and constructed that the tendency of the fluidized pulverulent material to escape into the various working parts of the apparatus is greatly minimized.

A more specific object of this invention is to provide a novel and improved apparatus for conveying pulverulent material through the use of compressed air and in which the apparatus is so constructed that the compressed air that constitutes the fluidizing and conveying medium is arranged to flow in such a manner as to preclude the fluidized pulverulent material from escaping into the various sealing and bearing means of the apparatus.

These and other objects and advantages of this invention will more fully appear from the following description, made in connection with the accompanying drawings, wherein like reference characters refer to the same or similar parts throughout the several views, and in which.

Figure 1:
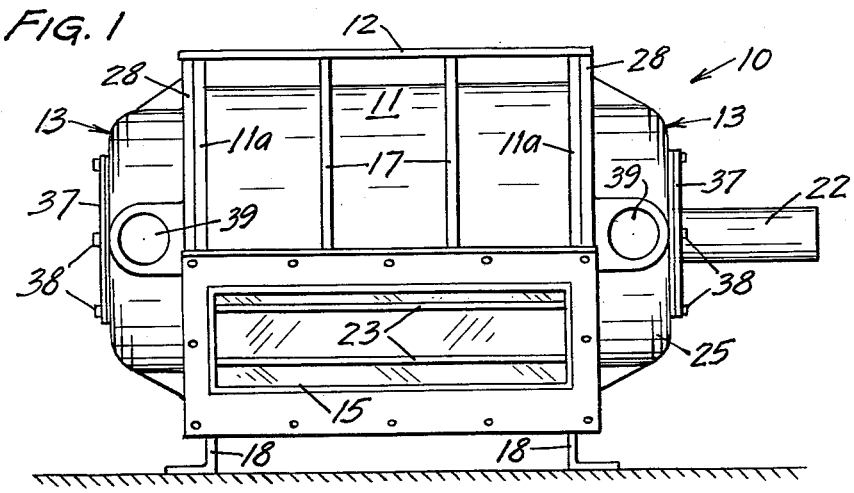
FIG. 1 is a side elevation view of my invention.

One embodiment of my novel material conveying apparatus as illustrated in the drawing is in the form of a rotor 10. In use, rotor 10 will be mounted beneath a hopper or trailer where the hopper or trailer is adapted to carry a load of pulverulent material therein and will be provided with a discharge outlet to permit the pulverulent material to descend into the rotor 10 to a point where it will be fluidized and thereafter conveyed through a discharge conduit.

Figure 2:
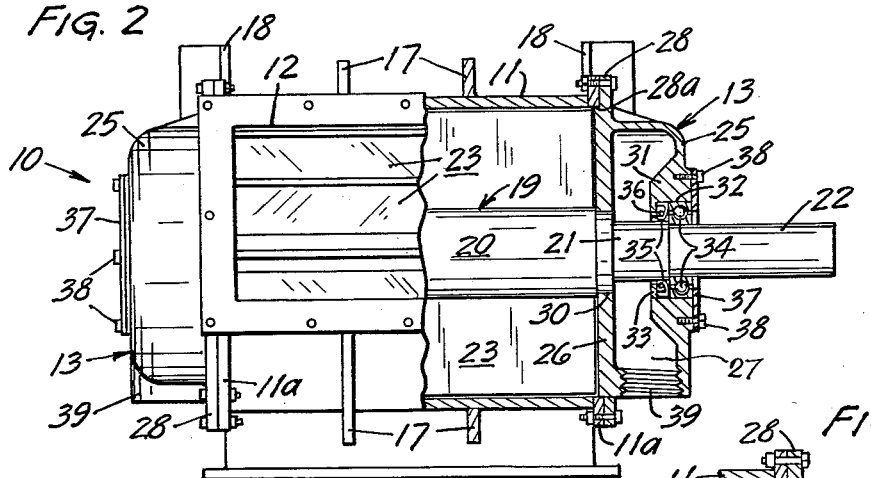
FIG. 2 is a top plan view of my invention with portions thereof broken away to show the interior.
Figure 3:
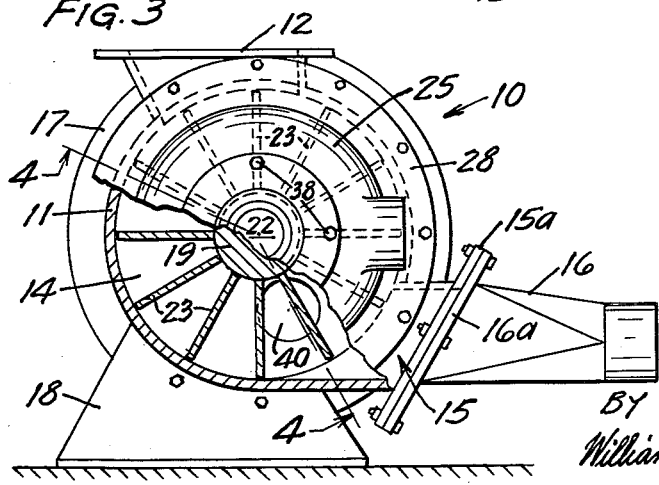
FIG. 3 is an end view of my invention partly in elevation and partly in section.

Rotor 10 includes a substantially cylindrical housing 11 having a material inlet 12 in the upper portion thereof for receiving pulverulent material therethrough. Material inlet 12, as best seen in FIGS. 2 and 3, is provided with flanges at the upper end thereof which facilitate attachment of the rotor to the underside of the trailer or hopper so that the material inlet 12 will be in registering relation with a material outlet of the trailer so that material conveyed through such a discharge outlet will descend through the material inlet 12 and into housing 11. It is also pointed out that the rotor will be mounted so that the axis of the rotor 10 will be disposed in substantial horizontal relation.

It will also be seen that rotor 10 includes a pair of end structures 13 each of which is secured to one end of the housing 11 and these end structures cooperate with housing 11 to define a substantially closed cylindrical mixing chamber 14 within the interior of housing 11 as best seen in FIGS. 2 and 3. Referring now to FIG. 3, it will be seen that housing 11 is provided with a tangentially extending discharge outlet 14 which extends horizontally from the lowest point of the housing so that the flow of pulverulent material out of the housing will move tangentially relative to the rotation of the rotor valve or bladed rotor shaft which will be described hereinafter. The discharge outlet 15 has a flanged outer end 15a which is attached to the flanged end 16a of a discharge conduit 16 also clearly shown in FIG. 3. Housing 11 is also provided with a plurality of vertically extending ribs 17 which serve to reinforce the side portions of the housing and the lower portion of housing 11 is also provided with a pair of axially spaced angle plates 18 adjacent each end thereof and each of which facilitate mounting of the rotor to a trailer type vehicle.

My novel rotor 10 includes a rotor shaft 19 which is positioned in co-axial relation within the cylindrical mixing chamber 14 and which includes an enlarged central portion 20, a reduced intermediate portion 21 and a reduced end portion 22 as best seen in FIG. 2. It will be noted that the reduced intermediate portion 21 and the reduced end portion 22 of the rotor shaft are journalled in the end structure 13 and that one of the reduced end portions 22 extends beyond its associated end structure 13 and is adapted to be connected to a variable speed drive mechanism (not shown). Referring now to FIG. 3, it will be seen that the enlarged portion 20 of rotor shaft 19 is provided with a plurality of blade members 23 which extend between the circumferential surface of the rotor shaft to a position in close proximity to the interior surface of the housing 11. The clearance between the ends of the blades and the interior surface of the housing is in the nature of .002 inch so that very little, if any, air will escape between the ends of these blades and the interior surface of the housing during rotation thereof. It is also pointed out that these blade members 23 extend longitudinally of the rotor shaft 19 so that as they rotate with the shaft, they will engage the pulverulent material descending through the material inlet 12 and carry the material around to a position where it will be fluidized by the flow of compressed air and actuated so as to be conveyed by the compressed air outwardly through the tangential discharge outlet 15 is a substantially solid stream. It will also be noted that the adjacent blades 23 actually form conveying compartments with the interior surface of the housing 11 to transport or convey the pulverulent material around the enlarged portion 20 of rotor shaft 19 to a position for discharge through the tangential discharge outlet 15.

Figure 4:
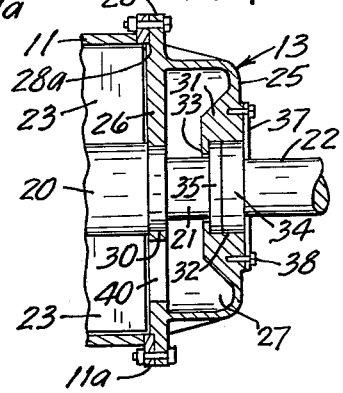
FIG. 4 is a section taken approximately along line 4—4 of FIG. 3 and looking in the direction of the arrows.

It has been found that when pulverulent materials are fluidized by intermingling the material with a gas such as compressed air, there is a tendency of small amounts of the materials to escape into various working parts of the apparatus such as around sealing means, bearing structures and the like. In this connection, my novel rotor is so arranged and constructed that the tendency of pulverulent materials to escape into the sealing and bearing means is completely precluded. To this end, I have provided uniquely constructed end members 13 which as seen in the drawing, are of substantially hollow bell-shaped configuration. Referring now to FIGS. 2 and 4, it will be seen that each of the end structures 13 is comprised of a shell portion 25 having its peripheral edges secured to face plate 26. The shell portion 25 and the face plate 26 are of integral construction and cooperate with each other to define a hollow buffer chamber 27 therebetween, as best seen in FIG. 2. Reference to FIG. 2 will show that the housing 11 is provided with an annular flange 11a at each end thereof and each of these flanges 11a is disposed in abutting relation with a correspondingly shaped annular flange 28 integrally formed with each of the face plate members 26. It should be noted, however, that the annular flange 28 on each of the end structures 13 is offset axially from the plane of the inner face of face plate 26 to define a small annular shoulder 28a. It will be seen that when annular flange 11a is secured to annular flange 28, by bolts or the like, the shoulder 28a will be positioned within the annular flange 11a in abutting relation therewith. Thus an effective air seal is provided so that no compressed air may escape between flange 11a and flange 28.

Each face plate 26 is provided with a centrally located aperture 30 through which the rotor shaft 19 extends. Shell portion 25 is provided with a centrally located, annular, thickened bearing-support portion 31 which projects inwardly towards face plate 26 and which defines a circular recess or aperture 32 disposed in co-axial alignment with opening 30 of face plate 26. This bearing support portion 31 has a small annular flange 33 extending radially inwardly from adjacent the innermost face thereof as best seen in FIG. 2. A ball-type bearing 34 is disposed within the recess 32 and in coaxial bearing relation with the reduced end portion 22 of the roller shaft 19. An annular seal 35 is disposed around the reduced intermediate portion of rotor shaft 19 and is interposed between the ball bearing and the annular flange 33 of bearing support portion 31. A small coil spring element 36 is disposed around the annular seal 35 and urges the seal into engagement with the shaft whereby the bearing is completely sealed from the interior of the buffer chamber 27. Each end structure is provided with an end plate 37 which is secured to the thickened annular bearing support portion 31 by means of bolts 38 and which serves to retain the bearing and seal assembly in place. It is pointed out that during rotation of the shaft 19, the spring element 36 will be caused to tighten up thereby urging the sealing ring into tighter engagement with the rotor shaft. It should also be noted that the enlarged portion 20 of rotor shaft 19 has a slightly reduced portion where the enlarged portion passes through the opening 30 of the face plate 26. Thus it will be seen that axial displacement of the rotor shaft is precluded and it will also be noted that the intermediate portion 21 bears against the ball bearing 34 in a manner such that the ball bearing functions somewhat as a thrust bearing.

Each of the end structures 13 is also provided with an air inlet 39 which is adapted to be connected to a source of compressed air (not shown) and each of the face plates 26 of the end structures is provided with an aperture 40 extending between mixing chamber 14 and buffer chamber 27 and these air ports 40 actually function as air inlet means for the mixing chamber 14. These apertures 40 are disposed directly opposite each other relative to the rotor 10 and it will be noted that each is located adjacent the lower portion of the housing and also adjacent the discharge outlet side of the housing.

Reference to FIG. 3 will show that the air apertures 40 are positioned so that, as the blades 23 rotate, each blade will pass beyond these air apertures and it will also be noted that each of the air apertures are also positioned so that they communicate with more than one compartment defined by the blades 23 at all times.

It will be seen that as compressed air is introduced through the compressed air inlets 39 of each of the end members 13, the air will be constantly circulated within the buffer chambers 27 and will thereafter flow through the air ports or apertures 40 into the mixing chamber so that the flow of compressed air will tend to pass directly through the housing 11 along the lower portion thereof and longitudinally thereof and discharged tangentially through the discharge outlet 15. There is a slight pressure differential between the buffer chambers 27 of each of the end structures 13 and the mixing chamber 14 so that the air pressure within the buffer chamber is always slightly higher than the pressure within the mixing chamber. Thus it will be seen that even if any of the fluidized pulverulent material does leak into the buffer chamber, it mixes with the incoming air and eventually will flow into the mixing chamber through the aperture 40. With this arrangement, the buffer chamber is interposed between the ball bearing 34 and seal 35 of each end structure so that the air flowing through this buffer chamber will preclude the escape of pulverulent material into the bearings or seal and since the bearings will be kept free of pulverulent material, the efficiency of the machine will be greatly increased.

It will therefore be seen from the preceding paragraphs that I have provided a novel material conveying apparatus which is so arranged and constructed that it will function in a more efficient manner than the most efficient apparatus heretofore known. It will also be seen from the foregoing description that I have provided a novel rotor apparatus for conveying pulverulent material in a fluidized state and which is so arranged and constructed that the compressed air which constitutes the fluidizing medium of my apparatus is arranged to flow in such a manner that the tendency of the pulverulent material to escape into the bearings and seals of the apparatus is completely precluded. Thus it will be seen that the tendency of my novel apparatus to malfunction because of clogged bearings is minimized so that a great saving in labor is therefore effected.

It will, of course, be understood that various changes may be made in the form, details, arrangement and proportions of the parts without departing from the scope of this invention which consists of the matter shown and described herein and set forth in the appended claims.

What is claimed is:

1. Apparatus for use in the transportation of pulverulent materials, said apparatus comprising a substantially closed cylindrical mixing chamber constructed and arranged to receive such pulverulent material therewithin and having a pair of compressed air inlets and a discharge outlet, compartmentalized conveyor means moving within said chamber for moving its compartments past said air inlet and discharge outlet including extending elements extending through the ends of said chamber, end structure associated with opposite ends of said mixing chamber and each including sealing means cooperating with said extending elements for preventing the escape of pulverulent material therefrom, each of said end structures defining a buffer chamber being in free fluid communication with said mixing chamber through said pair of compressed air inlets and disposed between said sealing means and the associated end of said compartmentalized conveyor means, said buffer chambers being adapted to be connected to a source of air having a minimum pressure at least equal to the pressure of air passing through the air inlets into the mixing chamber whereby the passage of pulverulent material from said mixing chamber into said buffer chambers will be precluded.

2. Apparatus for use in the transportation of pulverulent materials, said apparatus comprising a substantially closed cylindrical mixing chamber constructed and arranged to receive such pulverulent material therewithin and having a pair of compressed air inlets and a discharge outlet, a rotor including an extending shaft mounted for rotation within said chamber and having a plurality of circumferentially spaced blades extending outwardly therefrom for rotation therewith, end structures associated with opposite ends of said mixing chambers each including sealing means sealingly engaging said rotor shaft, each of said end structures defining a buffer chamber being in free fluid communication with said mixing chamber through said pair of compressed air inlets and disposed between said sealing means and the associated end of said rotor blades, each of said buffer chambers being adapted to be connected to a source of air having a minimum pressure at least equal to the pressure of the air passing through the air inlets into the mixing chamber whereby passage of pulverulent material from said mixing chamber into said buffer chambers will be precluded.

3. Apparatus for use in the transportation of pulverulent materials, said apparatus comprising a substantially closed cylindrical mixing chamber constructed and arranged to receive such pulverulent material therewithin and having a discharge outlet, a rotor including an extending shaft mounted for rotation within said chamber and having a plurality of circumferentially spaced blades extending outwardly therefrom for rotation therewith, end structures associated with opposite ends of said mixing chamber and each including sealing means sealingly engaging said rotor shaft, each of said end structures including a buffer chamber disposed between said sealing means and the associated end of said rotor blades, each of said buffer chambers being in free fluid communication with said mixing chamber through an aperture and each having a compressed air inlet adapted to be connected to a source of air under pressure and arranged to cause compressed air when so connected to first flow into said buffer chamber and to thereafter flow into the mixing chamber through said aperture in such a manner that the minimum pressure of the air within the buffer chambers will be at least equal to the air in the mixing chamber whereby passage of pulverulent material from said mixing chamber into said buffer chambers will be precluded.

4. The structure as defined in claim 3 wherein each of said end structures is provided with shaft bearing means for rotatably supporting said rotor and each of which is positioned externally of its associated buffer chamber.

5. Apparatus for use in the transportation of pulverulent materials, said apparatus comprising a substantially closed cylindrical mixing chamber constructed and arranged to receive such pulverulent material therewithin and having a discharge outlet, a rotor mounted for rotation within said chamber having a shaft extending beyond said mixing chamber and having a plurality of circumferentially spaced blades extending outwardly therefrom for rotation therewith, end structures secured to opposite ends of said mixing chamber and each including sealing means sealingly engaging said rotor shaft, each of said end structures including a buffer chamber disposed between said sealing means and the associated end of said rotor blade and each having an opening extending between its associated buffer chamber and said mixing chamber and connecting the two in the fluid communication, each of said buffer chambers having a compressed air inlet adapted to be connected to a source of air under pressure and arranged to cause compressed air when so connected to first flow into said buffer chambers and to thereafter flow freely into the mixing chamber with the pressure of the air within the buffer chambers being slightly greater than the pressure within the mixing chamber whereby passage of pulverulent material from said mixing chamber into said buffer chambers will be precluded.

6. The structure as defined in claim 3 wherein each of said end structures is provided with a rotor bearing means for rotatably supporting said rotor and each of which is positioned externally of its associated buffer chamber.

7. The structure as defined in claim 5 wherein the openings between each of the buffer chambers and said mixing chamber are in substantial axial alignment.

8. The structure as defined in claim 5 wherein each of said end members is of substantially hollow bell-shape configuration.

9. Apparatus for use in the transportation of pulverulent materials, said apparatus comprising a bladed rotor with an extended shaft, a substantially cylindrical housing surrounding said rotor and encasing at least a major portion thereof, a pair of hollow end members fixedly secured to opposite ends of said housing and cooperating with said housing to define a mixing chamber, said rotor having a plurality of circumferentially spaced blades extending outwardly therefrom for rotation therewith within said housing, said housing having a material receiving opening formed therein arranged to receive pulverulent material therethrough and having a discharge outlet, each of said hollow end members including sealing means for sealingly engaging said rotor shaft and each of said end members defining a buffer chamber disposed between said sealing means and the associated ends of said rotor blades, each of said buffer chambers being in free fluid communication with said mixing chamber and each having an air inlet adapted to be connected to a source of compressed air under pressure and arranged to cause compressed air when so connected to first flow into said buffer chambers and to thereafter flow into the mixing chamber thereby creating a pressure differential between the buffer chambers and the mixing chamber and in which the pressure within the buffer chambers is slightly greater than the pressure within the mixing chamber whereby passage of pulverulent material from the mixing chamber to said buffing chamber will be precluded.

10. Apparatus for use in the transportation of pulverulent materials, said apparatus comprising a substantially closed cylindrical mixing chamber constructed and arranged to receive such pulverulent material therewithin and having a discharge outlet, a rotor having a shaft mounted for rotation within said chamber and having a plurality of circumferentially spaced blades extending outwardly therefrom for rotation therewith, chamber-defining end structures secured to opposite ends of said mixing chamber and each defining a buffer chamber thereat, each of said chamber-defining end structures including an end wall interposed between its associated buffer chamber and the ends of said rotor blade and each including sealing means sealingly engaging said rotor shaft in spaced relation to said wall, each of said end walls having an opening therein such that said buffer chambers are in constant free fluid communication with said mixing chamber, and each of said buffer chambers having a compressed air inlet adapted to be connected to a source of air under pressure and arranged to cause compressed air when so connected to first flow into said buffer chambers and to thereafter flow into the mixing chamber with the pressure of air within the buffer chambers being slightly greater than the pressure within the mixing chamber whereby passage of pulverulent material from said mixing chamber into said buffer chambers will be precluded.

11. The structure as defined in claim 10 wherein said openings in said end walls are in radial alignment.

References Cited in the file of this patent

UNITED STATES PATENTS

| | | |
|---|---|---|
| 1,279,804 | Welcker | Sept. 24, 1918 |
| 2,750,233 | Yellott | June 12, 1956 |
| 2,750,234 | Yellott | June 12, 1956 |

FOREIGN PATENTS

| | | |
|---|---|---|
| 573,259 | Canada | Mar. 31, 1959 |
| 608,765 | Germany | Jan. 31, 1935 |
| 695,382 | Great Britain | Aug. 12, 1953 |